United States Patent [19]

Townsley et al.

[11] Patent Number: 5,557,738
[45] Date of Patent: Sep. 17, 1996

[54] POWER SYSTEM CONFIGURATION AND RECOVERY FROM A POWER FAULT CONDITION IN A COMPUTER SYSTEM HAVING MULTIPLE POWER SUPPLIES

[75] Inventors: David B. Townsley; Andrew Gong, both of Cupertino; Eva Henin, Los Altos, all of Calif.

[73] Assignee: Apple Computer, Inc., Cupertino, Calif.

[21] Appl. No.: 239,602

[22] Filed: May 9, 1994

[51] Int. Cl.⁶ .................... H02J 7/00; G06F 1/26
[52] U.S. Cl. .............. 395/182.12; 395/750; 307/66; 307/80
[58] Field of Search ............... 395/750; 307/66, 307/80

[56] References Cited

U.S. PATENT DOCUMENTS

| | | | |
|---|---|---|---|
| Re. 33,087 | 10/1989 | Bradford et al. | 307/64 |
| 3,808,452 | 4/1974 | Hutchinson | 307/64 |
| 3,852,727 | 12/1974 | Chacon | 340/213 R |
| 3,890,559 | 6/1975 | Kuster | 323/21 |
| 4,143,283 | 3/1979 | Graf et al. | 307/66 |
| 4,307,455 | 12/1981 | Juhasz et al. | 364/900 |
| 4,356,550 | 10/1982 | Katzman et al. | 364/200 |
| 4,638,175 | 1/1987 | Bradford et al. | 307/64 |
| 4,639,864 | 1/1987 | Katzman et al. | 364/200 |
| 4,652,769 | 3/1987 | Smith et al. | 307/31 |
| 4,860,185 | 8/1989 | Brewer et al. | 363/41 |
| 4,907,150 | 3/1990 | Arroyo et al. | 364/200 |
| 4,967,347 | 10/1990 | Smith et al. | 364/200 |
| 4,977,537 | 12/1990 | Dias et al. | 364/900 |
| 5,019,717 | 5/1991 | McMurry et al. | 307/66 |
| 5,184,025 | 2/1993 | McCurry et al. | 307/66 |
| 5,187,396 | 2/1993 | Armstrong II, et al. | 307/494 |
| 5,300,874 | 4/1994 | Shimamoto et al. | 320/15 |
| 5,349,668 | 9/1994 | Gladstein et al. | 395/750 |

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

A power system fault handling mechanism for portable electronic devices having multiple power supplies. A safety-net circuit is triggered when a power fault condition is detected. The safety-net circuit is a diode-based bridging circuit which couples all available power supplies to the power load, yet avoids feeding power back from any of the supplies to one another. This ensures that the load continues to receive power after a fault condition occurs without interruption. A microcontroller may then implement routines to switch to a working power supply so that the device may resume normal operation. The power system fault detection mechanism thus allows for the switching between system power supplies without disrupting a running process.

17 Claims, 10 Drawing Sheets

POWER SYSTEM CONFIGURATION AND RECOVERY FROM A POWER FAULT CONDITION IN A COMPUTER SYSTEM HAVING MULTIPLE POWER SUPPLIES

BACKGROUND OF THE INVENTION

1. Related Applications

The present invention is related to co-pending U.S. patent application entitled "Power Fault Protection in a Computer System Having Multiple Power Supplies", Ser. No. 08/239,748, assigned to the assignee of the present invention and filed concurrently herewith.

2. Field of the Invention

The present invention relates to power management for portable electronic systems. More particularly, the present invention relates to power fault detection and protection methods and mechanisms for portable computer systems having multiple power sources.

3. Art Background

As the computer revolution has progressed, computing machines have become ever smaller, yet more powerful. The advent of advanced semiconductor technologies has resulted in computers that are easily transportable. Today, portable laptop computers which utilize advanced packaging techniques are nearly as common as desktop computers were just a few years ago. The efforts of computer architects today, using emerging technologies, is the ever smaller, faster portable computer that is lightweight, extremely modular and flexible in its use.

An important consideration in designing portable computing devices, or any portable electronic device is the configuration of the power system. Ideally, when a computer is used at a fixed location, the user should be able to plug the device in to an AC-power outlet and derive power for the device by means of an AC adapter or equivalent technology, where DC power is supplied to the computer after being converted by the AC adapter. When the portability aspect of the device is being utilized, and electric wall sockets are unavailable, the portable computer must operate from battery power. While battery technologies are improving, they still suffer the unfortunate characteristics of being large and heavy relative to the overall size and weight of portable devices.

In an effort to meet the above goals of lightweight, modular systems having increased flexibility, computer makers have begun exploring the possibility of providing multiple power sources, including more than one battery compartment. This allows for more flexibility in designing around space constraints in tightly packaged small systems. The price of this increased flexibility is increased complexity with respect to power management subsystems. For example, when more than one battery pack is provided for, the computer system must provide additional battery contacts and provide for the coordination of selecting an optimal operating power source.

Another object of the evolving computer revolution has been to make computers more "friendly". Computers that lose data or require re-initializing because of power problems are decidedly unfriendly. Further, it is a disadvantage of many systems to have to shut down the computer system when changing from one power supply to another. It would be desirable, and is therefore an object of the present invention, to provide a reliable power supply management system for portable computers having multiple power sources.

SUMMARY OF THE INVENTION

From the foregoing, it can be appreciated that there is a need to provide superior power system control techniques for densely integrated portable electronic systems having multiple power supplies. Accordingly, it is an object of the present invention to provide a method and apparatus for the seamless transition between power sources in a portable computer system having multiple power sources. It is also an object of the present invention to provide a fault detection and protection technique for a computer system that encounters a power fault when operating from one of several available power supplies. It is another object of the present invention to provide a method and apparatus to recover from such power faults in such a way that power source transitions are not disruptive to a running computer system.

These and other objects of the present invention are provided in one embodiment of a portable computer system that utilizes five (5) available power supplies: power from an AC adapter and power cord, a cigarette lighter adapter for use in a car, two separate battery power bays, and a state-preserving rechargeable lithium coin-stack battery. During normal computer system operation, only one power source provides power to the components of the computer system. The power management system is driven by a software operated microcontroller which provides driving signals to a Programmable Array Logic (PAL) device for operating the power system's switching circuits.

The power system is provided with fault detection circuitry which monitors the voltage level of the power being supplied to the computer system components. If that supply voltage drops below a threshold level, a safety-net circuit is triggered. The threshold level for activating the safety-net circuit varies depending on whether the system is being powered by an AC line voltage or by a battery.

The safety-net circuit that is triggered upon detection of a power fault provides a fault indicating signal to the PAL. When the fault indicating signal is received by the PAL, it propagates appropriate signals to a plurality of the power system's switches which cause all available power supplies to be bridged through an arrangement of diodes. This guarantees that the load (the computer system) will continue to receive power from the combined power supply available to the system. Additionally, while the fault condition is active, a backup low power regulator is provided with a control signal which turns the regulator on for ensuring that the system's parameter memory and the microcontroller are maintained in a safe state.

Once a power system fault condition has been detected and the available power supplies are bridged by the safety-net circuit, a routine running in the power system microcontroller may begin the process of determining the best way to recover from the power system fault condition in a controlled fashion (i.e., selecting the appropriate power supply to designate as the system's operating power supply). Once a power supply is designated as the system's power supply, the fault condition transition situation is terminated and the computer system resumes normal operation. The entire process may occur without interruption to a user operating the computer system. This mechanism allows a user to switch from an AC power source to a battery source without halting a running process. Likewise, a user may remove one battery pack and continue operating from the other without having to shut down the system.

An additional aspect of the present invention is the ability of software to induce the fault condition state. Software may take advantage of the hardware based power fault recovery method to connect all power sources together. The hardware and software together bridge the transition from running from one power source to another with the software having the responsibility for choosing the proper source under varying operating scenarios.

BRIEF DESCRIPTION OF THE DRAWINGS

The objects, features and advantages of the present invention will be apparent from the following detailed description in which.

DETAILED DESCRIPTION OF THE INVENTION

A method and apparatus are described for the handling of power system fault conditions in one embodiment of a portable computer system which utilizes two batteries as well as having the ability to operate from an AC line voltage via an AC adapter. The implementation of the present invention in a particular electronic device should not be seen as limiting because the present invention may be suitable for use in any portable electronic device capable of operating from multiple available power sources. Throughout this detailed description numerous details are specified such as nominal voltages and discrete signal names, in order to provide a thorough understanding of the present invention. To one skilled in the art, however, it will be appreciated that the present invention may be practiced without such specific details. In other instances, well-known control structures and gate level circuits have not been shown in detail in order not to obscure the present invention. Particularly, a microcontroller and separate programmable array logic (PAL) are described for implementing the control circuitry in one embodiment.

With today's device technology, the development of specialized integrated circuits and programmable logic generally do not require the rendering of fully detailed circuit diagrams. The definition of logic functionality and state diagrams allow computer design techniques to design the desired logic and circuits. Additionally, microcontrollers are known to operate based on a desired flow diagram rendered into software that is compatible with a selected microcontroller. Accordingly, portions of the present invention will be described primarily in terms of functionality to be implemented by a microcontroller and a PAL. This functionality will be described in detail with logic equations and flow diagrams will be used for illustration. Those of ordinary skill in the art, once given the following descriptions of the various functions to be carried out by the present invention will be able to implement the necessary microcontroller structure and logic for the PAL in suitable technologies without undue experimentation. As an alternative to using a PAL, those of ordinary skill in the art will recognize that various random logic devices or a custom designed integrated circuit could be implemented.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

Overview of a Computer System Utilizing the Present Invention

Figure 1:
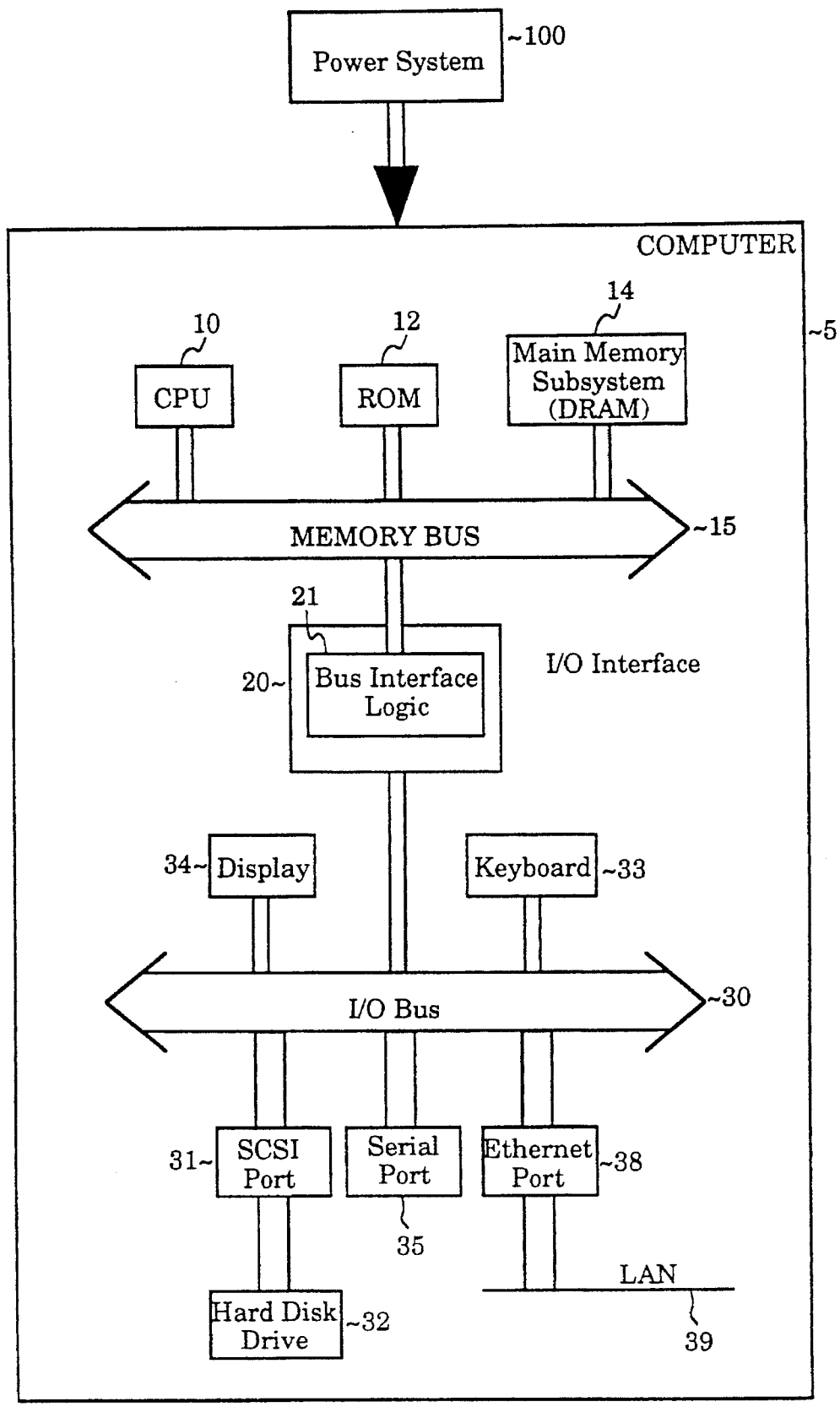
FIG. 1 illustrates a block diagram of a computer architecture incorporating the present invention power system fault handling mechanism.

Referring now to FIG. 1, one embodiment of a portable computer architecture implementing the present invention is shown. The constituents of the computer 5 are shown coupled to a CPU or memory bus 15. The memory bus 15 provides the signal path for the exchanging of signals between the various elements coupled to the memory bus. Further provided by the memory bus are control lines for such things as bus request and bus granting signals and other system control signals. As with many conventional computer systems, the architecture illustrated in FIG. 1 includes a CPU 10, ROM 12 and the system's main memory subsystem 14 coupled to the memory bus 15. It should be understood that in the illustration the main memory subsystem 14 coupled to the memory bus refers to the system's DRAM and the controller required for writing to and reading from the DRAM based on a requested transaction.

Also shown coupled to the memory bus 15 in the computer 5 is an I/O interface 20 which is used for coupling the memory bus 15 to the I/O bus 30 for providing the computer system with a number of I/O capabilities. The I/O interface 20 shown in the figure incorporates bus interface logic 21 which controls the transactions between the main memory system 14 and I/O devices. The I/O bus 30 provides the avenue for a number of different I/O devices to be incorporated in the computer system. For example, the SCSI port 31 is coupled to the I/O bus 30. SCSI stands for Small Computer System Interface which is one of the computer industry standards for coupling I/O devices such as the hard disk drive 32 or floppy drives or other storage media and other I/O devices. The computer system also has a serial port 35 which is shown coupled to the I/O bus 30. The serial port 35 can be used for attaching a modem or printer or other serial devices. Additionally, the I/O bus 30 may be used to couple the computer system to a local area network (LAN) 39 through an ethernet port 38. This allows the computer system to communicate with other computer systems and share common resources such as community printers, etc. In portable computer systems, an ethernet port provides for a rapid attachment and separation of the portable system to a running network. Finally, there is shown coupled to the I/O bus 30 a keyboard 33 and display 34 which provide the user's interface to the computer 5. Other devices, such as a floppy disk drive may also be incorporated into the computer 5.

Most of the computer system components shown in FIG. 1 require electrical power in order to operate. Therefore, in FIG. 1 there is shown coupled to the computer 5 the power system 100. The power system 100 is the focus of the present invention which is tailored for a portable computing device. One embodiment of the present invention power system provides for an external AC adapter to provide power when AC line voltage is available. The power system also provides for two separate battery packs to be utilized in operating the computer when it is being used in its portable capacity. Finally, a backup battery pack is provided for maintaining the computer system's state when no other power sources are available. The operational relationship of these power supplies will be described below.

Figure 2:
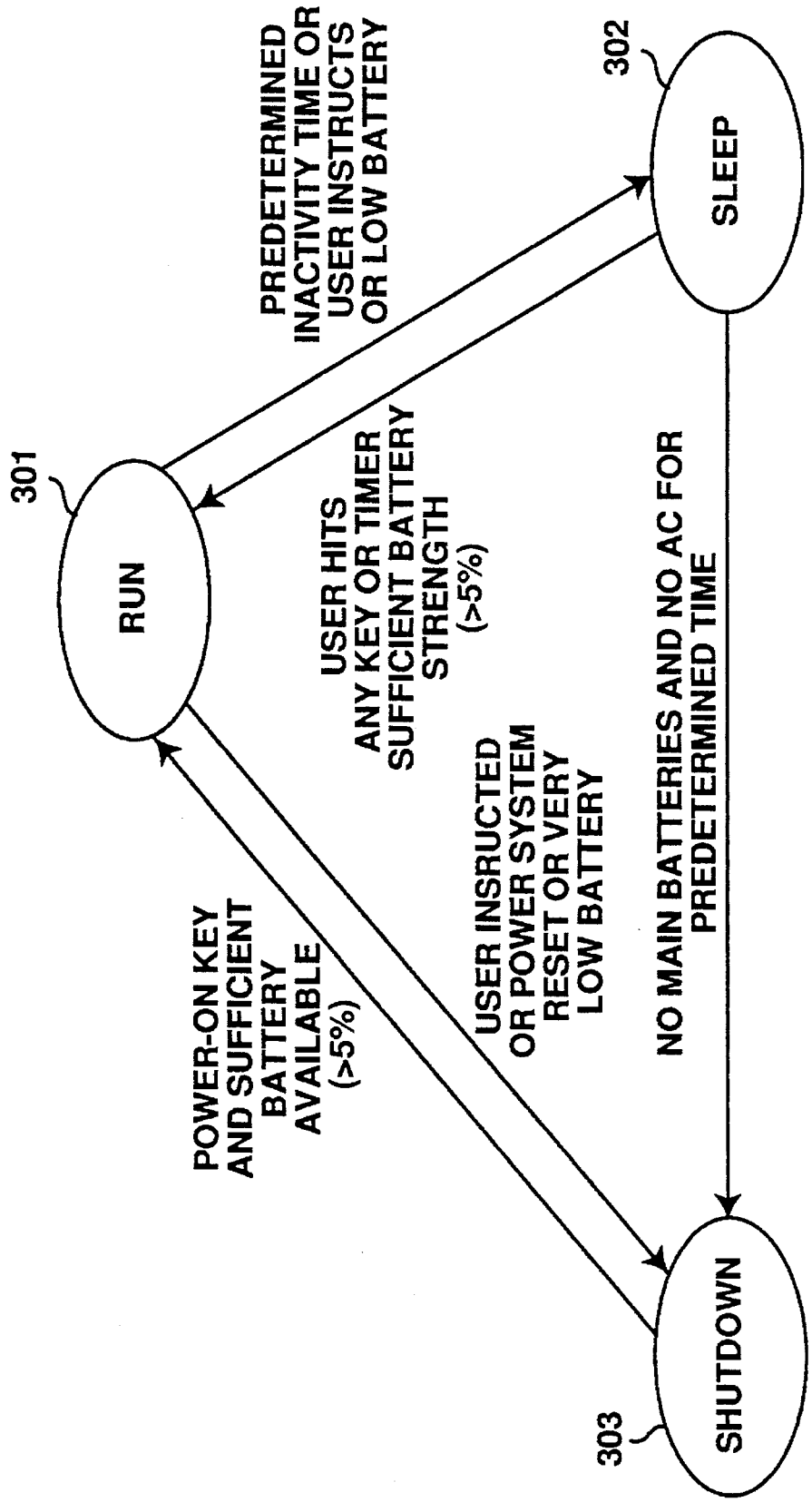
FIG. 2 illustrates the various states in which a portable computer incorporating the present invention may operate.

Desktop computers generally exist in one of two power states: on or off. With battery operated computers, for power savings purposes, a third state is introduced. FIG. 2 is a state diagram illustrating three possible power states of a battery operated computer. During normal operation the system exists in a run state 301 in which all components of the computer may be active and are operationally available for performing their tasks. A sleep state 302 is introduced that the computer system may enter from the run state, generally after a predetermined period of inactivity or if instructed by the user of the computer. In the sleep state, the power consumption of the system is reduced by deactivating various energy consuming portions of the computer system that are not currently needed. The run state 301 may be re-entered from the sleep state 302, for example, by the depressing of any key on the computer system's keyboard in which case power will then go back to those components which were deactivated in the sleep state. The shut down state 303 corresponds to the usual off state for computers, but for portable computers such things as charging of batteries and other internal maintenance may occur in this state. The transition from the shut down state 303 to the run state 301 occurs if the user depresses the power-on key for the computer system and if there is sufficient power available to run the computer system. A transition directly from the run to the shut down state is available which the user may initiate when finished using the computer or which may occur if the power supply becomes insufficient to operate the computer system.

Power System Fault Handling of the Present Invention

One portable computer system incorporating the present invention is configured with two power bays each for receiving battery packs. The portable computer system implements a pointing device in the lower central portion of the computer casing which is one of the reasons necessitating two power bays. The use of multiple power bays also provides for increased modularity in portable systems.

Figure 3:
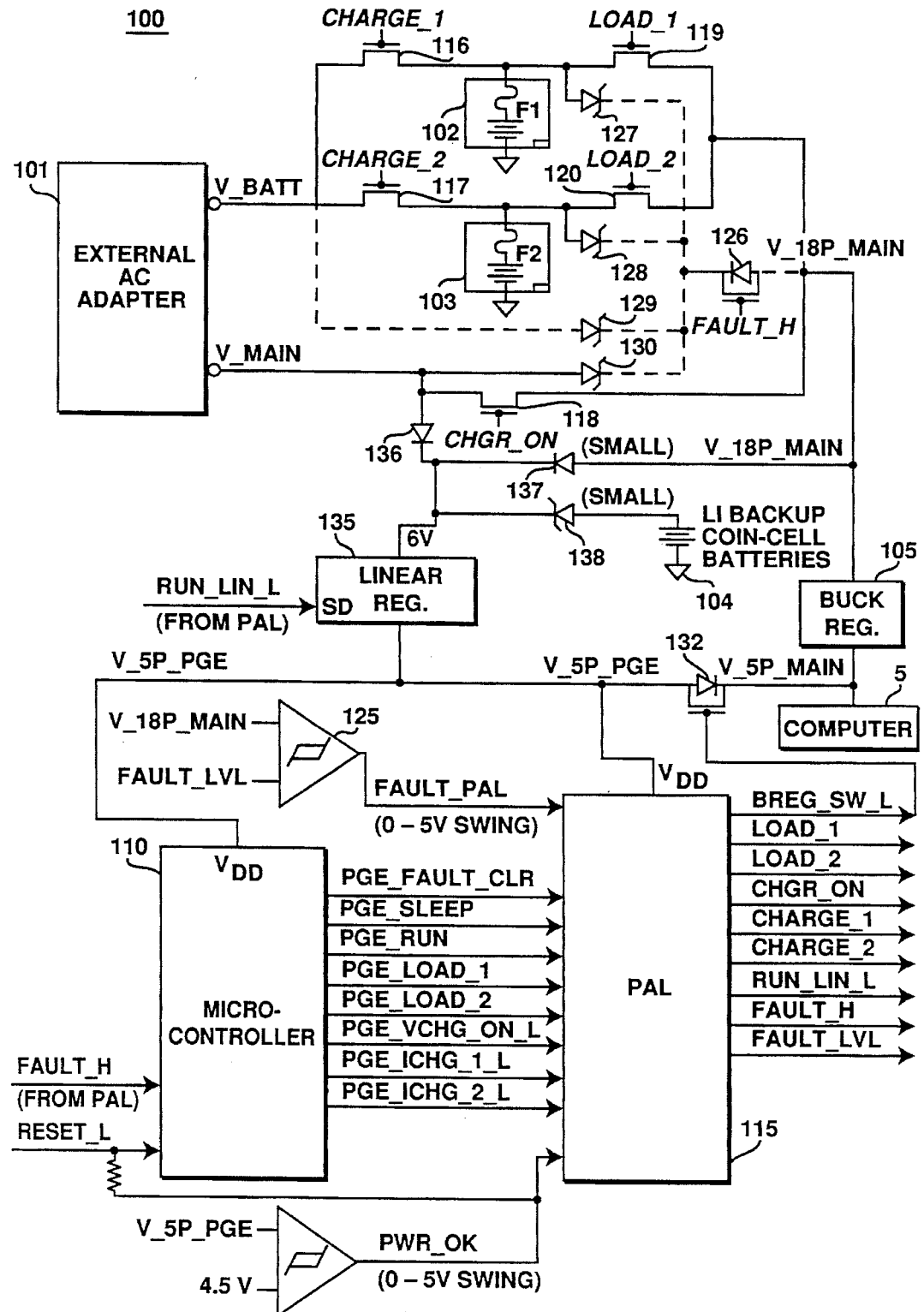
FIG. 3 illustrates a circuit diagram of a computer power control system incorporating the present invention.

Referring now to FIG. 3 a power system oriented view of the computer system of the present invention is shown. The power system 100 is shown in detail coupled generally to the computer 5. The diagram of FIG. 3 illustrates four (4) possible power supplies for the computer system: an external AC adapter 101, two separate batteries 102 and 103 as well as a backup battery 104. The external AC adapter 101 is used to provide power to the computer 5 through the buck regulator 105 when there is an available AC line voltage to plug the computer system into. The AC adapter optimally provides 16.8 volts output to the system and is also used for charging the batteries 102 and 103 when they require charging and the adapter is plugged-in to an available AC line voltage. Note that although the illustrated embodiment indicates separate outputs from the AC adapter (V_BATT and V_MAIN), a simpler AC adapter could be employed that collapses these two outputs into a single output.

The lithium backup coin-cell batteries 104 are used when no other power source is available to the system. They provide a minimal power supply to the computer system when it is operating in sleep mode or during shut down to preserve the parameter RAM of the computer system as well as other states such as monitor configurations, etc. More about the operation of the backup cells 104 will be described below.

Batteries 102 and 103 are the power supplies tapped by the system when no AC line voltage is available. In one embodiment, the batteries are rechargeable nickel-metal-hybride batteries. Having both batteries present in FIG. 3 best exemplifies the operation of the present invention. There are some circumstances in which only one battery is present for providing power to the system when no AC line voltage is available. During normal operation of the computer by battery, an intelligent battery discharging scheme is implemented for selecting which battery should provide the computer system with power. The actual battery hierarchical discharging scheme is beyond the scope of the present invention which is concerned with fault management regardless of the chosen discharging scheme. The present invention merely assumes that during normal operation, one power source will be selected according to some predetermined criteria.

Essentially, microcontroller 110 is programmed with a routine which optimizes the system for longevity and reliability. The microcontroller 110 provides operating signals to the programmable array logic (PAL) 115 which provides the actual control signals to the components of the power management system. For example, when the computer system is operating from an AC line voltage through AC adapter 101, the microcontroller 110 may determine that either battery 102 or battery 103 (or both) should be recharged by power from the AC adapter 101. For the charging of battery 102, the microcontroller sends a signal PGE_ICHG_1_L to the PAL 115. The PAL 115 in response to the PGE_ICHG_1_L signal propagates a CHARGE_1 signal to the CHARGE_1 FET 116. Similarly, if the microcontroller 110 determines that the battery 103 should be charged from the AC adapter 101, the microcontroller propagates a PGE_ICHG_2_L to the PAL 115 which in turn activates the CHARGE_2 signal to the gate of the CHARGE_2 FET 117. Note also that for the microcontroller 110 to instruct the system to run from power supplied by the AC adapter 101, it propagates a signal PGE_VCHG_ON_L to the PAL 115 which in turn provides the CHGR_ON signal to the CHGR_ON FET 118. The activation of the FET 118 provides a power path from the AC adapter 101 for the operating voltage through the buck regulator 105 to the rest of the computer system 5.

When the computer is not plugged into an AC line voltage, the microcontroller 110 makes a determination as to which battery should be operating the system according to the discharging rules under which it operates. If it determines that battery 102 should be utilized, then the microcontroller provides PGE_LOAD_1 signal to the PAL 115 which responsively sends the signal LOAD_1 to the LOAD_1 FET 119. Similarly, if the microcontroller 110 determines that the battery 103 should be used to power the system, then the microcontroller provides a PGE_LOAD_2 control to the PAL 115 which in turn propagates the LOAD_2 signal to the LOAD_2 FET 120.

The power being provided from the selected power source to the system is identified in the figure has V_18P_MAIN. This source is also provided to a fault detection comparator 125. In addition to the V_18P_MAIN source being provided to the fault comparator 125, a signal designated FAULT_LVL is also input to the comparator 125. When the V_18P_MAIN signal drops below the FAULT_LVL threshold, a fault condition is considered to exist. The comparator 125 then provides an active FAULT_PAL signal to the PAL 115.

The source of the FAULT_LVL threshold signal is from the PAL 115. The fault level threshold varies depending on which power source the system is running from. If the AC adapter 101 is being used to power the system, the fault level is set to approximately 15.5 volts which is about 1.3 volts lower than the 16.8 volt normal operating voltage from the AC adapter 101. The fault level is set to a different value if the computer system is running from one of the batteries. Batteries are subject to a wider swing in voltage ranges depending upon the charge levels. The normal range of the battery output is expected to be between 8 and 11.5 volts, with approximately 10 volts being nominal. Accordingly, when the computer system is operating from one of the batteries, the FAULT_LVL threshold is set to approximately 7.5 volts.

When the fault detection comparator 125 detects that the V_18P_MAIN signal has dropped below the fault level threshold, a resulting FAULT_PAL signal is provided to PAL 115 which activates the output signal FAULT_H from the PAL. The FAULT_H signal is provided to the gate of fault detection system trigger FET 126. When FET 126 is activated, all available system power supplies are bridged together through diodes 127, 128, 129 and 130. The diodes ensure that power only flows away from the power supplies so none are shorted together. Simultaneously, FETs 116–120 are deactivated by the PAL 115 to avoid shorting power supplies together. Note that in the event that an AC adapter is implemented that has only one output line, diodes 129 and 130 would be replaced with a single diode for coupling that output from the AC adapter in the bridged circuit.

Regardless of what power supply was operating the computer system, once a fault condition is detected, all the power supplies are coupled together to provide the V_18P_MAIN source to the computer system. This guarantees a power supply to the computer system during the fault state. The FAULT_H signal is also propagated to the microcontroller 110 to inform the microcontroller that a fault condition exists and directing it to initiate its fault handling routine for selecting an appropriate single power source to operate from in a controlled fashion. The dashed path of FIG. 3 illustrates the power supply propagation to the system when a fault condition exists.

It should also be noted that the power source to the microcontroller 110 and the PAL 115 is a power line noted as V_5P_PGE which is an output from the buck regulator 105 or the linear regulator 135. The buck regulator 105 powers this V_5P_PGE line through FET 132 in the run and sleep states during normal operation. However, if FAULT_H is active, the linear regulator is used to power V_5P_PGE with FET 132 turned off (open). This protects the state of the microcontroller 110 and PAL 115 as a second safety net. More particularly, when a fault condition exists and the FAULT_H signal has gone high, the FET 132 is deactivated, responsive to the BREG_SW_L signal from the PAL to choke off the power supply from the buck regulator 105 to the microcontroller 110 and PAL 115. In the fault condition state, the PAL 115 also outputs a signal RUN_LIN_L which is provided to the backup linear regulator 135. This signal activates the linear regulator 135. Accordingly, when the fault condition exists, the bridged power supply source V_18P_MAIN as well as the power supply source from the backup battery 104 and AC adapter 101 through V_MAIN are supplied to the linear regulator 135 through bridging diodes 136, 137 and 138. The RUN_LIN_L signal, activating the backup linear regulator 135, causes it to output the V_5P_PGE signal to the microcontroller 110 and the PAL 115 to ensure that they operate properly during the existence of a fault condition.

Figure 4:
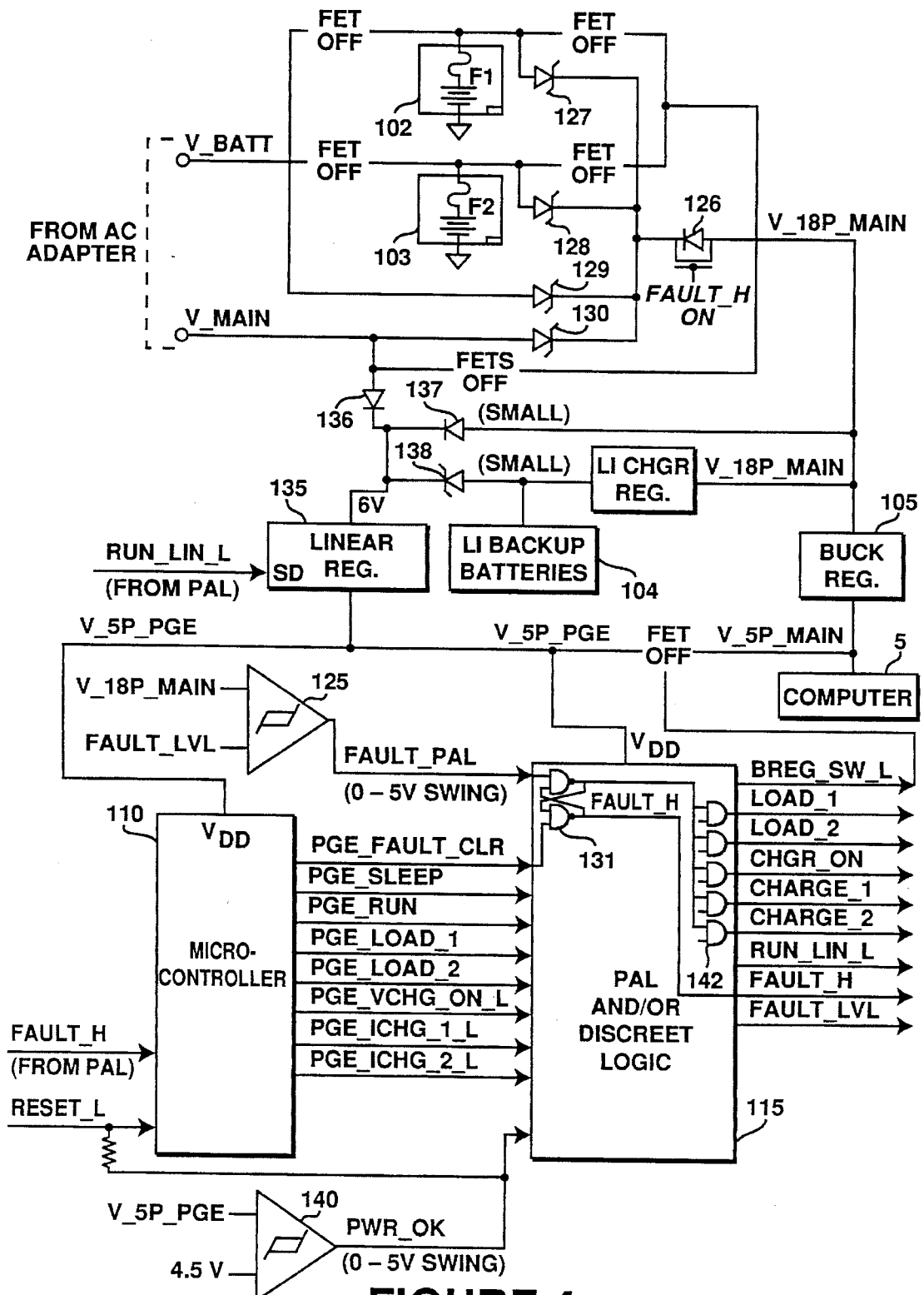
FIG. 4 illustrates a more detailed circuit diagram of the present invention power supply fault detection mechanism.

Referring now to FIG. 4, the circuit diagram of FIG. 3 is shown when the fault condition is active. The FETs 116, 117, 118, 119 and 120 are replaced with a symbol to indicate that those FETs are off. The FET 126 is "on" as described above, which creates a path for the power to be supplied from all sources via the path dictated by diodes 127, 128, 129 and 130. Also, the V_5P_PGE supply to the microcontroller 110 and PAL 115 are provided through the backup linear regulator 135. In FIG. 4, the PAL 115 is shown to include the functionality of a collection of AND gates 142. It can be seen that when the FAULT_PAL signal is sent active from the comparator 125, a flip-flop 131 changes state and then provides a signal to the functional equivalent of AND gates 142 to provide the signals to shut-off the FETs described above. The flip-flop 131 also allows the fault indicator signal FAULT_H to be provided to the microcontroller 110 and to the fault condition trigger FET 26. As was described, the FAULT_H signal is provided to the microcontroller 110 which notifies it to initiate its routines for resolving and recovering from the fault condition. Once the microcontroller 110 has completed the resolution of the fault condition, it sends a PGE_FAULT_CLR signal to the PAL 115 which resets the flip-flop 131 to the normal operating state and instructs the PAL which power supply should be provided an activation signal therefrom. The microcontroller 110 may wait a brief period of time before clearing the fault condition state in order to allow any transient fault conditions to resolve themselves.

Another aspect extending the present invention is the backup safety-net comparator 140. This comparator receives as one input the V_5P_PGE operating voltage that is supplied to the microcontroller 110 and PAL 115. A second input is set to approximately 4.5 volts. In the event that the operating voltage for the microcontroller and PAL drops below this trigger level, the comparator 140 sends a signal to reset the microcontroller 110 to a known state and provides the same signal to the PAL 115 which is used in determining the output signals described above and which will be described below with respect to the logic equations to be implemented by the PAL 115. Essentially this signal from comparator 140 causes the outputs of PAL 115 to go to non-hazardous states. One reason for monitoring the operating voltage of the microcontroller 110 and PAL 115 is to prevent them from sending spurious signals to the system when their power supply voltage falls below the acceptable operating region required for normal operation which could affect the software operation of the microcontroller. A particular concern is that the microcontroller not send a signal instructing a shorting of the two batteries together which could be disruptive to the system and certainly hazardous to the batteries.

Table I below identifies the inputs and outputs for one embodiment of the PAL logic 115. Table II below illustrates the random logic equations to be carried out by the PAL 115 in generating its output signals based on the above identified input signals. Table III below illustrates the logic performed by the comparators in monitoring for various fault conditions.

TABLE I

| PAL Logic Description | |
|---|---|
| Buffer Logic Inputs | Buffer Logic Outputs |
| PGE_RUN | BREG_SW_L |
| PGE_SLEEP | RUN_LIN_L |

TABLE I-continued

PAL Logic Description

| Buffer Logic Inputs | Buffer Logic Outputs |
| --- | --- |
| PGE_LOAD_1 | LOAD_1 |
| PGE_LOAD_2 | LOAD_2 |
| PGE_VCHG_ON_L | CHARGE_1 |
| PGE_ICHG_1_L | CHARGE_2 |
| PGE_ICHG_2_L | CHGR_ON |
| FAULT_PAL | FAULT_LVL |
| PGE_FAULT_CLR | FAULT_H |
| PWR_OK | |

TABLE II

Random Logic Equations

| | | |
| --- | --- | --- |
| FAULT_H | = | FAULT_H *!PGE_FAULT_CLR+FAULT_PAL* (PGE_RUN+PGE_SLEEP) |
| FAULT_LVL | = | !PGE_VCHG_ON_L*!PGE_LOAD_1*!PGE_LOAD_2*!PGE_SLEEP |
| LOAD_1 | = | !FAULT_H*PGE_LOAD_1*!PGE_LOAD_2 |
| LOAD_2 | = | (!FAULT_H*PGE_LOAD_2*!PGE_LOAD_1)+!PDS_IN_L*(PGE_SLEEP+PGE_RUN)*PWR_OK |
| CHARGE_2 | = | !FAULT_H*!PGE_ICHG_2_L*PGE_ICHG_1_L |
| BREG_SW_L | = | !(!fault_PAL*PGE_RUN*PWR_OK+PGE_SLEEP*FAULT_PAL*PWR_OK) |
| RUN_LIN_L | = | !FAULT_PAL*PGE_RUN*PWR_OK |
| CHARGE_1 | = | !(FAULT_H+PGE_ICHG_1_L) |
| CHGR_ON | = | !(FAULT_H+PGE_VCHG_ON_L) |

TABLE III

Comparator Equation

| | | |
| --- | --- | --- |
| FAULT_PAL | = | (V_18P_MAIN<REF.) |
| | | REF=15.0V (charger in) or |
| | | 7.5V (charger out) |
| PWR_OK | = | (V_5P_PGE<4.5V) |

The convention used in the above tables with respect to the random logic equations is that '!'=NOT; and asterisk, '*'=AND, and a plus sign, '+'=OR in evaluating the Boolean equations listed. In one embodiment, the signals are active high unless they are denoted with an '_L'. In addition to the signals already described above, some of the expressions use terms not yet identified. Note that PGE_RUN indicates that the system is in the run state and PGE_SLEEP indicates that the system is in the sleep state. These states are contrasted with the shut down state as described above with respect to FIG. 2. The PDS_IN_L signal referred to in the LOAD_2 equation is a signal that is active when something other than a battery is in the second battery bay instead of battery 103. Note that derivatives of this invention could use a subset or extension of the equations above to satisfy the needs of a particular power system implementation with or without expansion capabilities. Similarly, the comparator equation voltages can be altered to suit the needs dictated by battery and/or different AC adapter voltages.

In one embodiment of the power fault detection and protection mechanism, the bridging circuitry is only activated if the computer system is operating in either the run or sleep states which were described above. According to the logic equations in Table II, the FAULT_H signal is not allowed to go active in the event that the computer is in the shut down state. In the shut down state, however, the comparator 140 still monitors to make sure that the microcontroller 110 and the PAL 115 receive an appropriate operating voltage. It should be understood that these circuits may continue operating even in the shut down state to carry out such things as battery recharging, operating a built-in real-time clock and preserving a portion of memory dedicated to monitor configurations and virtual desktops, etc.

The description of the present invention power system is one that is software controlled through the microcontroller 110. The PAL 115 serves as a buffer to protect the power system from spurious controls that might occur in a fault condition. When a fault condition is detected, the power system is taken over by the comparator and PAL 115 in the above noted logic which prevents the microcontroller from issuing invalid and potentially dangerous signal state combinations to the power system switches. More importantly, the comparator and PAL are able to react much more quickly than the microcontroller which would suffer from software latency as a function of clock frequency. Therefore, the design keeps software based delays out of the response to a fault, until the transient has passed. Otherwise, a very high clock speed microcontroller (or powerful microcontroller) would be required to respond fast enough to "save" the computer state in a fault transient condition of falling voltage. Once in the fault condition state, the microcontroller may then recover and execute the necessary routines for recovering from the fault condition.

By buffering the microcontroller signals using the PAL and the safety-net circuit described above, a computer system in accordance with the present invention is allowed to continue operating through the existence of a fault condition. This provides the computer user with the flexibility to exchange power supplies "on the fly" without having to interrupt an operating session on the computer. Additionally, unforeseen accidents such as kicking a plug out of a wall socket are not as disastrous since the system automatically slides into the fault condition state until the microcontroller has time to shift the operation of the system to one of the batteries.

Microcontroller Routine for Recovering from a Fault Condition

Once the power control system of the present invention has entered into the fault condition state in which all power supplies are bridged together to ensure a continuing power supply to the computer system, the power system's microcontroller may initiate a fault recovery routine to resume normal operation of the computer from an appropriate single power supply. In general, operating from an AC voltage is the optimal choice for the power system. Main batteries provide the second choice for powering the system. Lastly, a small back-up battery is provided as a short term source for powering the system, while software selects a new main source. The remainder of this description will describe an overall power management routine, of which the fault-recovery routine is a cornerstone, which may be implemented for a specific embodiment computer system which may operate from the four (4) above-described power sources (the AC adapter, first and second batteries and the backup batteries) as well as a modified AC adapter suitable for use in an automobile by providing a cigarette lighter adapter mechanism. In the described embodiment, the car adapter is usable to provide power to run the computer, but is not tapped for charging batteries. It will be understood by those of ordinary skill in the art that the power management routine to be described below may be extended as necessary to cover alternative power supply configurations for various computer systems.

Before proceeding with the description below, another important feature of the present invention that should be noted is that in addition to providing a method to switch between power supplies in the event of a power fault condition, the present invention hardware fault circuitry may be intentionally triggered by software to provide for a graceful transition between power supplies. The routines described below, once the system is put into the fault condition state, are used to transparently select the best power source to continue supplying power to the computer system.

Figure 5:
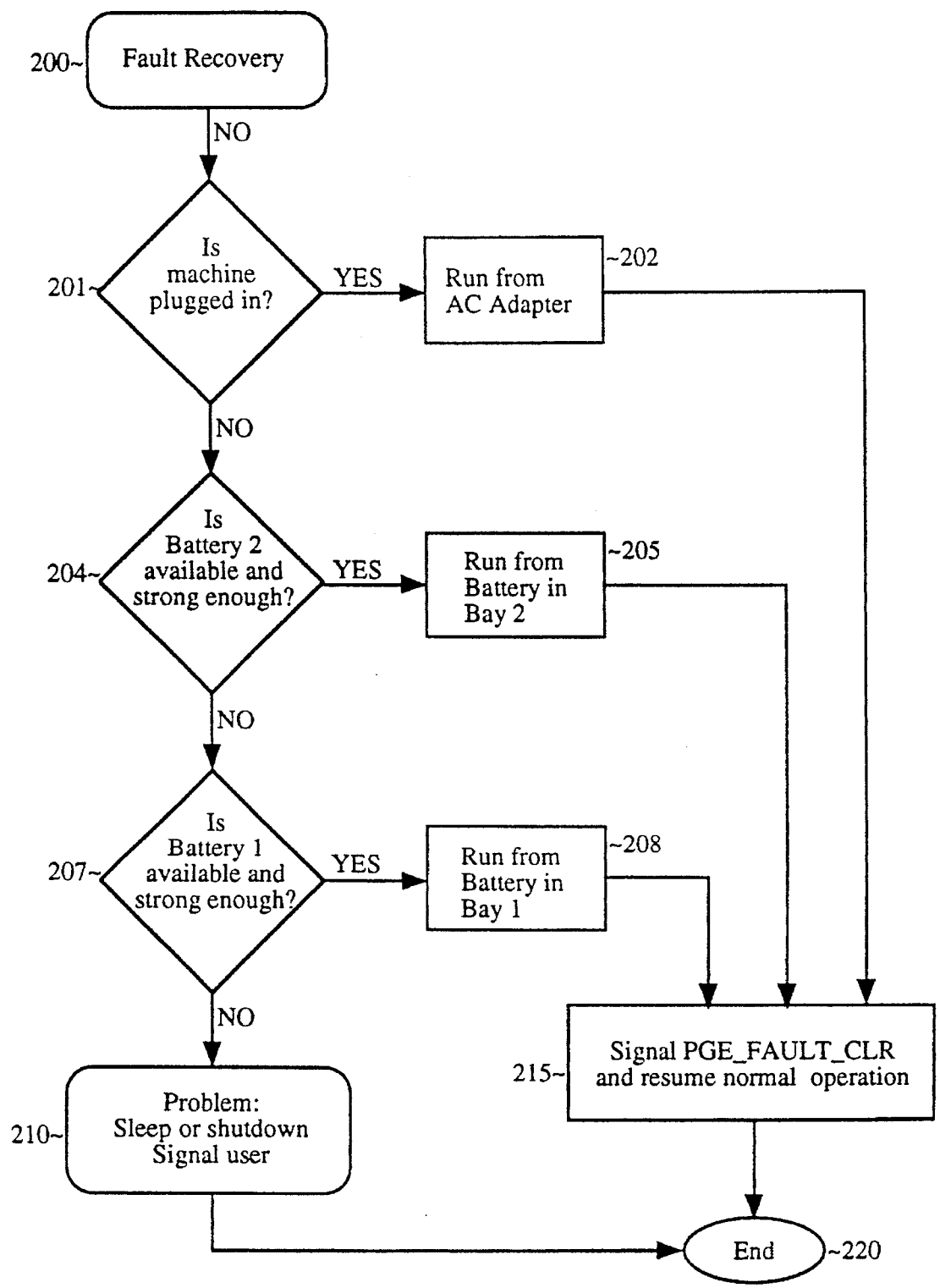
FIGS. 5–10 illustrate flowcharts embodying power system control routines to be carried out by one embodiment of the present invention.

Referring now to FIG. 5 the overall Power System Task routine 600 will be described. This routine is carried out periodically by the power system microcontroller described above (typically once a second or more frequently) in overseeing the power system of the present invention computer system. As was described, the microcontroller envisioned may be used for other purposes in addition to power system management, so the routines to be run may do so only periodically (i.e., perhaps once a second). This explains the desirability for the above-described hardware implemented safety-net circuits for triggering power fault condition states, wherein the hardware circuits may react much more quickly than software.

The routine 600 first determines at decision box 601 whether or not software has initiated a fault condition by checking to see whether or not a software flag, identified FaultFlag, has been set. If the flag has been set and a fault condition is being software induced, then at step 602 all power supplies are brought off line. This is done by opening all the load FETs as described above which results in the triggering of the hardware fault protection circuitry thus bridging all available power supplies. At step 603 a software wait timer is loaded to allow the stabilization of system signal transients.

If the flag FaultFlag has not been set, or after the AC timer is loaded at step 603, the routine proceeds to call the Check AC Source Validity routine 700. This routine determines the availability of AC adapter power for the system and will be described more fully below with respect to FIG. 6. The Power System Task routine 600 of FIG. 5 next determines whether or not the CPU is off at decision box 604, which determines whether or not the machine is in the shut down state or not. This is done because in this embodiment the hardware power fault condition bridge circuit is not available in shut down mode, so software routines need to manually bring a power source on-line. This is done to provide software prevention of excessive discharging of the batteries in shutdown. If the CPU is in shutdown mode, then the Bring Power Source Online routine 800 is executed which controls the selecting of a new power supply for the computer system. The routine 800 will be described more fully below with respect to FIG. 7. Once the routine 800 has completed, the Power System Task routine 600 is complete, due to the present power state of the machine, and returns at return box 615.

If the CPU is not in shutdown mode at decision step 604, then at decision box 605 the routine determines whether or not there is a valid AC power (adapter) source as determined above by the routine 700. If not, then at decision box 606 a determination is made as to whether or not the NoSource timer has expired at decision box 606. The NoSource timer is a timer that determines the period after which, if no power source has been selected, then one will probably not be selected, because none is available or operative. In such a case, the machine shuts down at step 607 and returns from the routine at return box 615. If the NoSource timer has not yet expired at decision box 606, then the Make Low Power Selection routine 900 is run. This routine is run in this case when no AC adapter power is available and the system has to determine whether or not one of the batteries may be switched to as the operating power source for the machine. Here, routine 900 is used only as a short term selection method, to be used in cases such as when the user is changing power sources. This routine will be described more fully below with respect to FIG. 8. Following the execution of that routine, the Power System Task routine 600 completes at return step 615.

If at decision box 605 there is a valid AC power source as determined by routine 700, then the NoSource timer is reset at step 608. At decision box 609, the microcontroller determines whether or not a hardware fault condition exists by determining if the FAULT_H input to the microcontroller has gone active. If there is a hardware fault condition, then the Fault Condition Handler routine 1000 is executed for handling the hardware fault condition and selecting a new power source. The Power System Task routine 600 then returns at step 615.

If at step 609 no hardware fault condition existed, then it is apparent that the computer may be configured to run from one of the AC adapters because it was determined at routine 700 that there was a valid AC power source. At decision box 610 the routine determines whether or not it should utilize the car AC adapter based on the determinations made during the execution of the Check AC Source Validity routine 700. If so, then at step 611, the microcontroller configures the computer system to run from the car adapter. Otherwise, at step 612, the machine is configured to run from the full AC adapter. As described above, if the routine configures for the car adapter, the car adapter will supply power to the computer system but not be available for charging the batteries. If the system is configured for the full AC adapter at step 612, then AC power will be available for both running the computer and recharging the batteries. The actual steps for configuring for a particular adapter will be described below with respect to FIG. 7. The main routine Power System Task 600 then returns at step 615.

Figure 6:
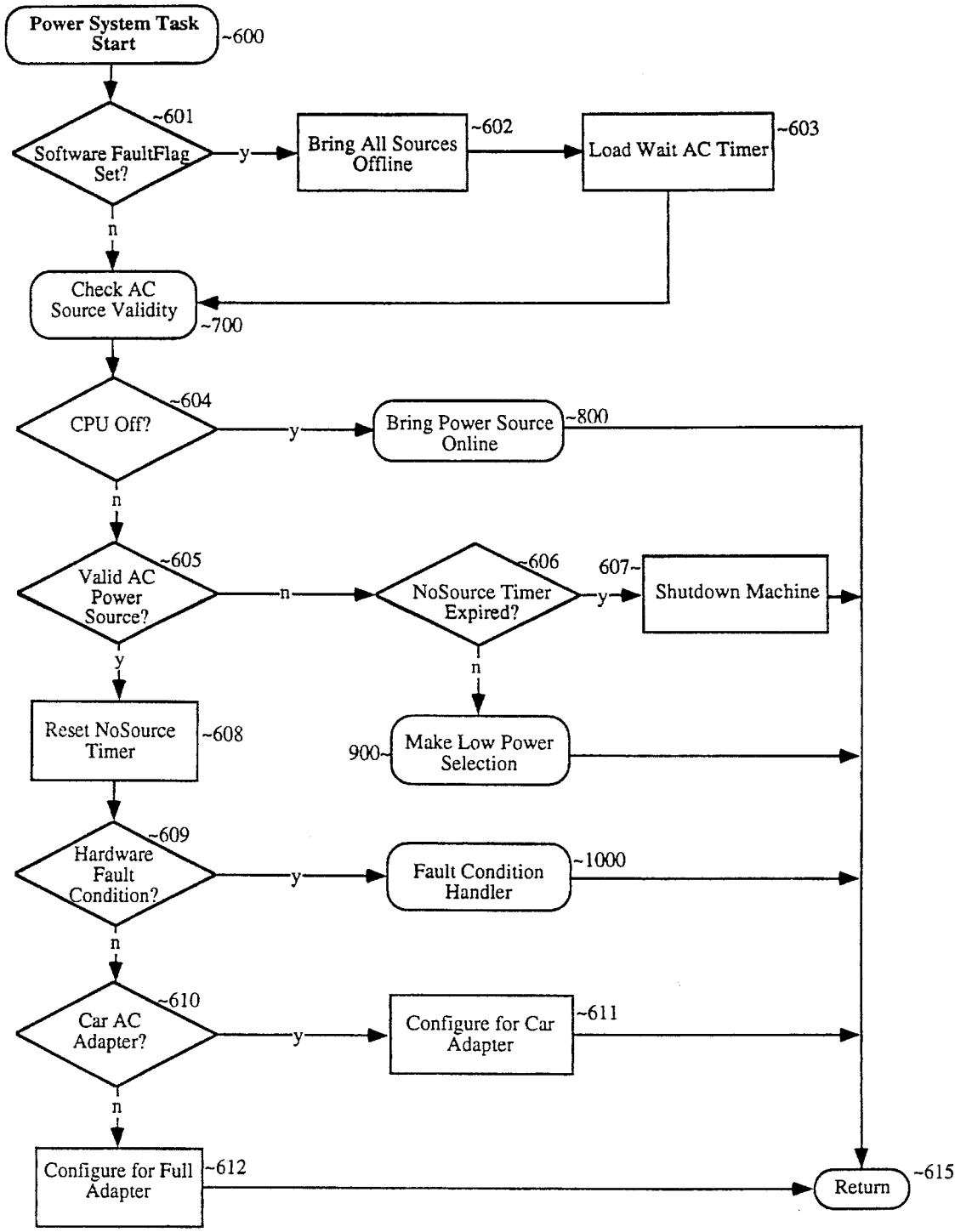

Referring now to FIG. 6, the Check AC Source Validity routine 700 will be described. The routine begins at step 701 where a voltage reading is taken from the full AC adapter line. In this embodiment, if the reading for the full AC-adapter output line is in bounds by registering between 6 V and 18 V then a software flag, "Full AC Valid", is set indicating that the full AC adapter (both output lines as described above) is available and valid. If the full AC adapter is not valid the routine then reads car AC adapter line voltage at step 705 and determines if at decision box 706 whether or not the car AC adapter line voltage is within bounds. If so, then at step 707, a software flag "Car AC Valid" is set, whereupon the routine returns at step 710. If neither AC adapter is within bounds, then the software FaultFlag is set at step 708, the AC wait timer is loaded at step 709, and the routine returns at step 710.

Figure 7:
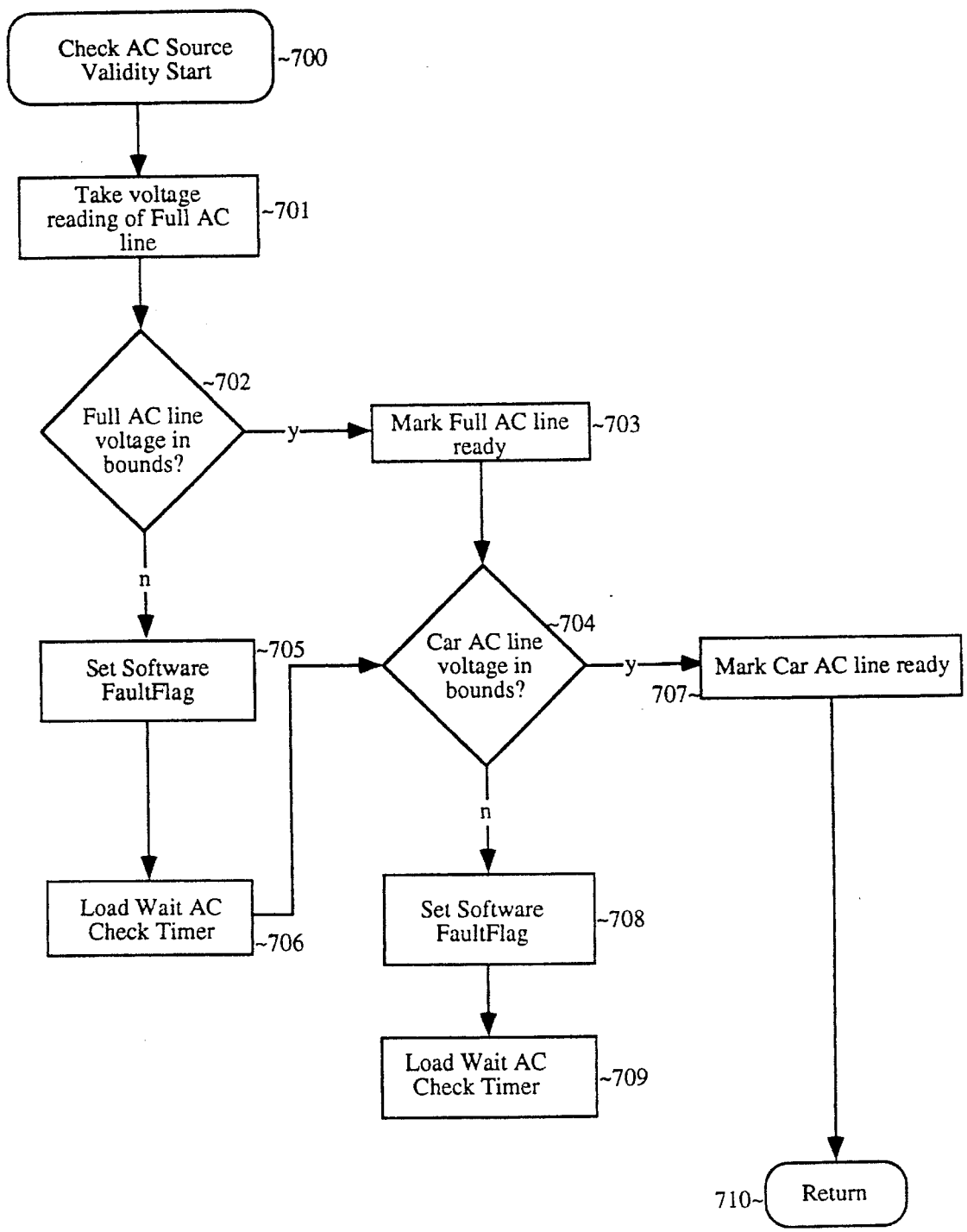

With reference to FIG. 7, the Bring Power Source Online routine 800 will be described. This routine selects an appropriate power supply to bring online according to a hierarchical preference selection criteria. The order of power supply preference may of course be varied in accordance with various embodiments. At decision box 801 the routine determines whether or not the wait timer has expired. If not, the routine returns at step 820. Before bringing a power source online, it is necessary for the timer to have expired in order to allow spurious signal and power transients to exhaust themselves. Once the wait timer has expired, then at decision box 802 the routine first tests to see if the DC voltage supplied from the full AC adapter output is valid as determined by the Check AC Source Validity routine 700 described above. If so, the routine then tests at step 803 whether or not the full AC line is already in use. If it is the routine returns at return step 830. If the full AC line is not already in use at decision box 803, then at step 804, the necessary hardware switches are set in order to bring a full AC adapter online. The AC power FET is activated, the battery power FET is deactivated, and battery charging is allowed when appropriate. The routine then returns at return step 830.

If the full AC adapter is not valid at decision box 802, then at test 805, the routine determines whether or not the car AC adapter was determined as valid at the Check AC Source Validity routine 700 described above. If so, then at test 806 a determination is made as to whether or not the car AC adapter is already in use in which the case the routine returns at step 830. If the car adapter is not already in use at test 806, then at step 807 the cigarette (car) lighter adapter is brought online: The AC power FET is closed, the battery power FETs are opened and battery charging from the AC adapter is disabled by deactivating the battery charging FETs because the cigarette lighter AC adapter does not support charging. The routine then returns at step 830.

If neither AC adapter is available, the routine first tests if battery 2 is good at step 808. A good battery is a battery that is present and contains sufficient energy to run the computer. This determination of a good battery is made by using a predetermined measurement method and threshold criteria upon the battery. If the battery is good, then at test 809 it is determined whether or not battery 2 is already in use, in which case the routine returns at step 830. If not, then at step 810 battery 2 is activated as the computer system's power source by deactivating the AC power FET, activating the power FET for battery 2, deactivating the battery 1 power FET and ensuring that the battery charging FETs are also deactivated. The routine then proceeds to return at step 830.

If battery 2 is not good and neither AC adapter is available, the routine then determines if battery 1 is good at decision box 811. If that battery is good, and not already in use at test 812, then step 813 is carried out to bring battery 1 online as the computer system's power supply. The AC power FETs are opened as is battery 2's power FET. Battery 1's power FET is closed, thereby providing a power path from battery 1 to the computer system. Also, the battery charging FETs are deactivated. If battery 1 is not good at decision box 811, then the Make Low Power Selection routine 900 is run. This routine is described below with respect to FIG. 8. That routine will ensure that all power sources are brought off line if no power source is adequate.

Figure 8:
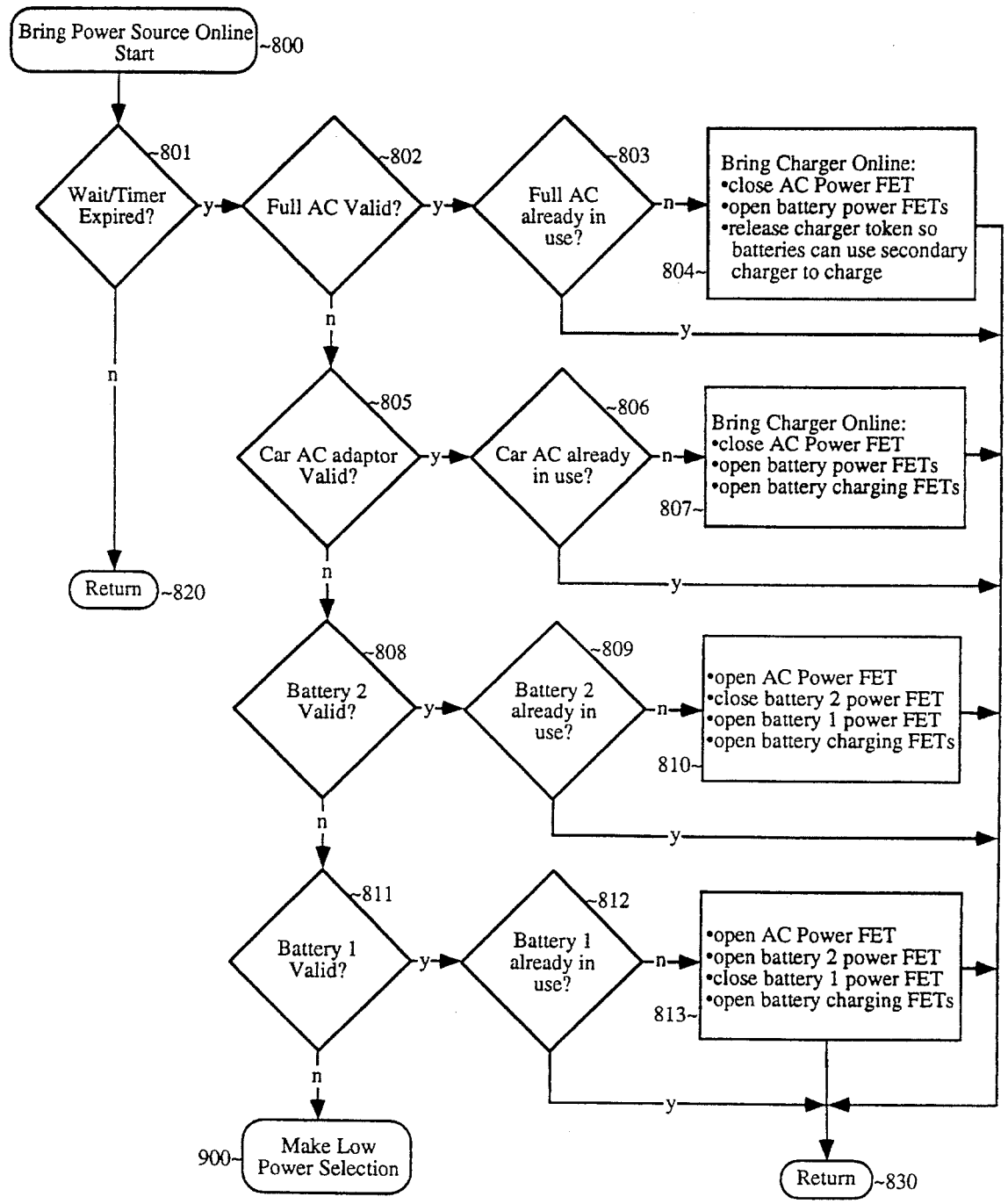

FIG. 8 illustrates the Make Low Power Selection routine 900. First, a determination is made at step 901 if battery 2 is adequate. This involves detecting its presence and checking that it has adequate energy. The determination of whether the battery has adequate energy may be made with an A/D check of battery voltage or by communicating with the battery if it is an intelligent battery and can provide its status. There is a distinction between a battery that is "adequate" and a battery that is "good". A battery is adequate if it is present and contains minimally sufficient energy to run the computer. An adequate battery will only be used to handle low-power short term conditions. A battery is good if it is present and contains energy in a sufficient margin above "adequate" such that the battery can continue to be used for a predetermined period without risk of losing data.

If battery 2 is adequate at test 901, then at test 902 it is determined whether or not battery 1 is adequate in a similar manner. If both batteries are adequate, then at step 903, the battery with the most capacity is brought online as the system's power supply. At step 905 the hardware is notified that any existing power fault condition has been handled by signaling fault clear signal to the PAL as described above. The routine then returns at step 910.

If at decision box 902 battery 2 had been adequate but battery 1 was not adequate, then battery 2 is brought online at step 904 and the fault condition is cleared at step 905 as above. Similarly, if battery 2 is not adequate at decision box 901, a determination is made at decision box 906 if battery 1 has any capacity. If so, it is brought online at step 907 and the routine proceeds to step 905 to clear the fault condition state. If neither battery 2 nor battery 1 is adequate at decision steps 901 and 906, then at step 908 all main power sources are brought offline and the microcontroller will continue to run from the backup battery.

Figure 9:
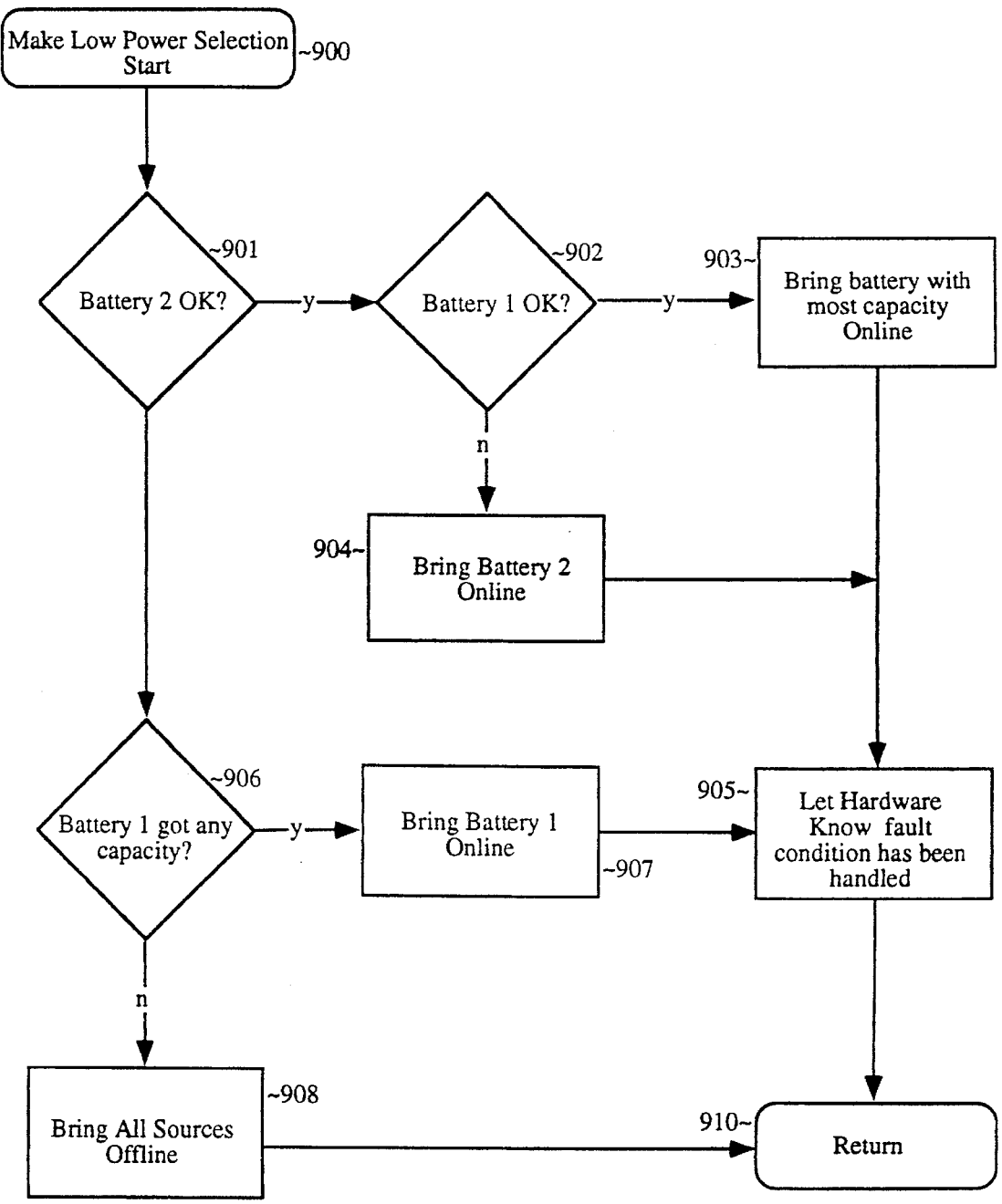
Figure 10:
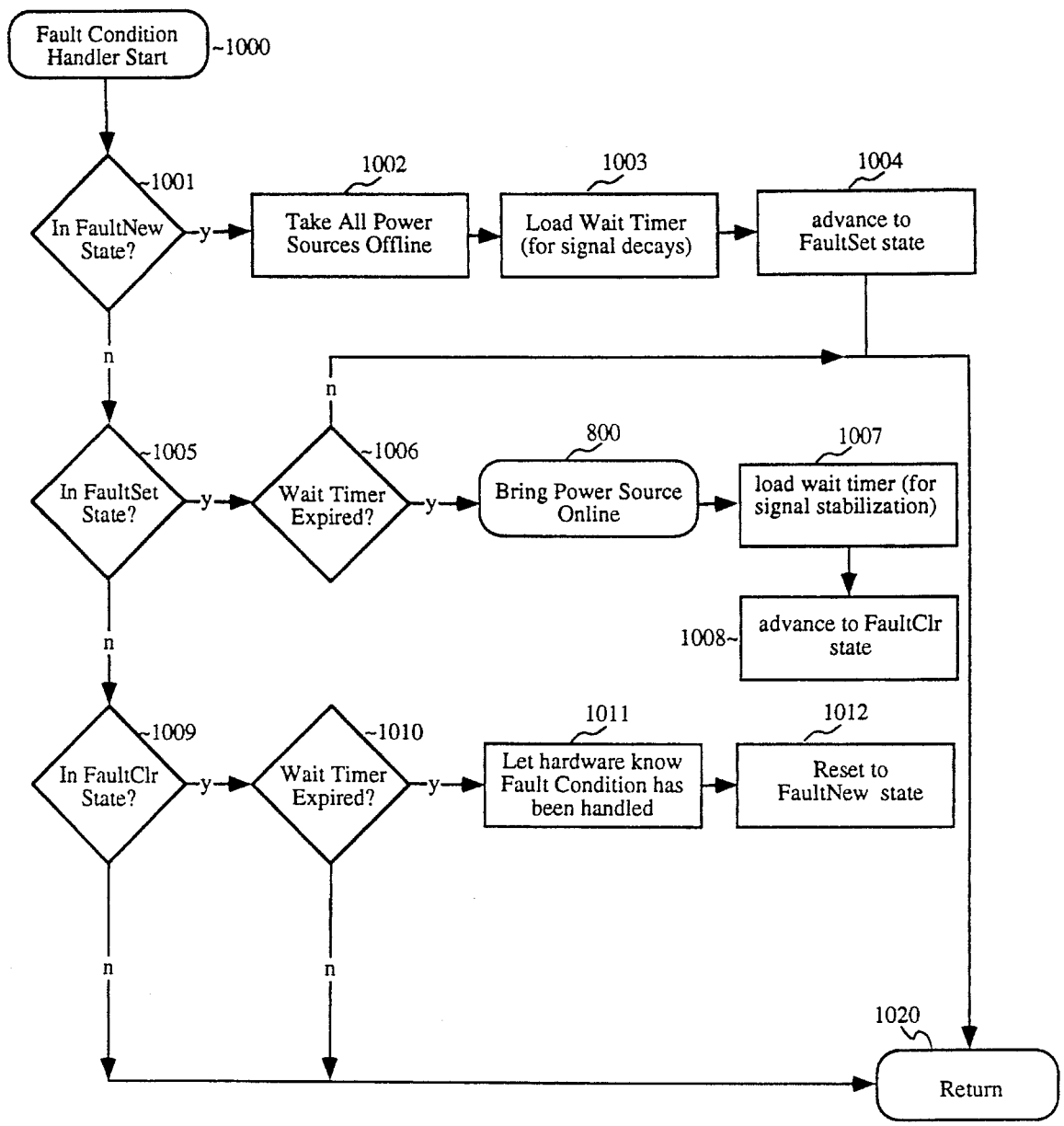

Referring now to FIG. 9, the Fault Condition Handler routine 1000 will be described. The Fault Condition Handler routine differentiates its operation based on the fault state of the system. If at decision box 1001 it is determined that the routine is in the FaultNew state then at step 1002 all power sources are taken offline, which triggers the hardware fault condition described below to make sure that all power supplies are bridged to support the system with whatever energy is available. At step 1003 a wait timer is loaded to ensure that all transient signals are given ample opportunity to decay and at step 1004 the routine is advanced to the FaultSet state, and returns at step 1020.

If at decision box 1005 the routine is in the FaultSet state, then it is determined at step 1006 if the wait timer has expired. If it hasn't the routine returns at step 1020. Once the wait timer has expired at step 1006, the Bring Power Source Online routine 800 is called. This routine is described above with respect to FIG. 7. At step 1007, a wait timer is loaded for signal stabilization, the routine advances at step 1008 to the FaultClr state, and returns at step 1020. Finally, at test 1009, if the routine is in the FaultClr state it proceeds to decision box 1010 where it is determined whether or not the wait timer has expired. If it has, then at step 1011 the hardware is notified that the fault condition has been handled. This is done by signaling the FAULT_CLR signal from the microcontroller to the PAL as described above. Finally, at step 1012 the state of the routine is reset to the FaultNew state for future execution of the Fault Condition Handler routine 1000. The routine returns to its calling routine at return step 1020.

There has thus been described a fault detection and protection mechanism for use in a computer system having multiple power supplies. The mechanism quickly intercepts fault conditions and protects the system while operating in the fault state by bridging all available power supplies to supply the system. Once that state has been entered, a software driven microcontroller will then have time to determine the best route to recover from the fault. Although the present invention has been described in terms of various embodiments, it will be appreciated that various modifications and alterations may be made by those skilled in the art without departing from the spirit and scope of the invention. The invention should, therefore, be measured in terms of the claims which follow.

What is claimed is:

1. For use in an electronic device having a plurality of available power supplies, a method of selecting one of the plurality of available power supplies for operating the electronic device comprising the steps of:

bridging all available power supplies simultaneously through a combined power path to provide power to the load of the electronic device;

iterating through a preference hierarchy of the plurality of available power supplies and selecting the first power supply in the hierarchy that is suitable for operating the electronic device; and switching the power system of the electronic device from the bridged power supply circuit to the first power supply in the hierarchy that is suitable for supplying power to the load of the electronic device.

2. The method of claims 1 wherein prior to the bridging step the method comprises the step of inducing a fault condition state to trigger said bridging step.

3. The method of claim 1 wherein prior to the bridging step the method comprises the step of detecting a power fault condition to trigger said bridging step.

4. The method of claim 1 further comprising the step of shutting down the electronic device if no suitable power supply is available after a predetermined amount of time.

5. The method of claim 4 further comprising the step of determining the availability of an A-C power source.

6. The method of claim 5 wherein the step of determining the availability of an A-C power source comprises the steps of:

measuring the voltage available from a first A-C adapter line; and measuring the voltage available from a second A-C adapter line.

7. The method of claim 5 wherein the iterating through a preference hierarchy step comprises the steps of:

determining if a first AC adapter is available for providing power to the load of the electronic device;

determining if a second AC adapter is available for providing power to the load of the electronic device;

determining if a first battery is available for providing power to the load of the electronic device; and determining if a second battery is available for providing power to the load of the electronic device.

8. The method of claim 7 wherein said switching step comprises the steps of:

activating the first AC adapter and deactivating the second AC adapter and the first and second batteries if the first AC adapter is valid;

activating the second AC adapter and deactivating the first AC adapter and the first and second batteries if the second AC adapter is valid;

activating the first battery and deactivating the first and second AC adapters and the second battery if the first battery is valid; and activating the second battery and deactivating the first and second AC adapters and the first battery if the second battery is valid.

9. The method of claim 8 further comprising the step of clearing a fault condition signal after the switching step.

10. A computer system comprising:

a processing unit for executing instructions and processing data;

a memory bus coupled to the processing unit for conveying instructions and data to and from the processing unit;

a memory subsystem coupled to the memory bus for storing instructions and computer data; and a power system for providing the computer system with operating power, the power system including:

a plurality of available power supplies for supplying an operating voltage to the computer system;

power supply bridging circuitry coupled to the plurality of available power supplies for operatively coupling the plurality of available power supplies simultaneously together for supplying power to the computer system over a combined power path; and power supply selection logic for switching the power system from the power supply bridging circuitry to a single one of the plurality of available power supplies selected according to a preference hierarchy of the plurality of available power supplies.

11. The computer system of claim 10 wherein the power supply selection logic comprises a microcontroller for providing control signals to the plurality of available power supplies and to the power supply bridging circuitry.

12. The computer system of claim 11 wherein the microcontroller comprises:

logic for iterating through a preference hierarchy of the plurality of available power supplies to determine the validity of each of the plurality of available power supplies; and logic for switching the power system from the power supply bridging circuitry to a selected one of the plurality of available power supplies, wherein the selected one of the plurality of available power supplies is the first valid power supply in the preference hierarchy.

13. The computer system of claim 12 wherein the plurality of available power supplies comprises first and second adapters and first and second batteries.

14. The computer system of claim 13 wherein the second AC adapter comprises an adapter capable of being coupled to an automobile cigarette lighter for deriving AC power for said computer system from a cigarette lighter socket in said automobile.

15. The computer system of claim 13 further comprising:

a timer for determining the amount of time no single power supply is brought online for supplying power to the computer system; and circuitry responsive to the timer for shutting down the computer system if no single power supply is brought online after a predetermined amount of time.

16. A power system for providing power to the load of an electronic device comprising:

a plurality of available power supplies for supplying an operating voltage to the load of the electronic device;

power supply bridging circuitry coupled to the plurality of available power supplies for operatively coupling the plurality of available power supplies simultaneously together for supplying power to the load of the electronic device over a combined power path; and power supply selection logic for switching the power system from the power supply bridging circuit to a single one of the plurality of available power supplies selected according to a preference hierarchy of the plurality of available power supplies.

17. The power system of claim 16 wherein the power supply selection logic comprises a microcontroller for providing control signals to the plurality of available power supplies and to the power supply bridging circuitry.

* * * * *